(12) United States Patent
Velamakanni et al.

(10) Patent No.: US 9,551,131 B2
(45) Date of Patent: Jan. 24, 2017

(54) POWER SYSTEM HAVING CLUTCH-BASED FUEL CONTROL MODES

(71) Applicant: Caterpillar Inc., Peoria, IL (US)

(72) Inventors: Sairam Gopalan Velamakanni, Peoria, IL (US); Eric W. Cler, Oswego, IL (US); Aaron Josiah Meyer, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 68 days.

(21) Appl. No.: 14/617,213

(22) Filed: Feb. 9, 2015

(65) Prior Publication Data

US 2016/0168825 A1 Jun. 16, 2016

Related U.S. Application Data

(60) Provisional application No. 62/089,967, filed on Dec. 10, 2014.

(51) Int. Cl.

| | |
|---|---|
| *G06F 7/70* | (2006.01) |
| *E02F 9/20* | (2006.01) |
| *F02D 41/02* | (2006.01) |
| *B60W 10/06* | (2006.01) |
| *F02D 11/10* | (2006.01) |
| *F02D 31/00* | (2006.01) |
| *E02F 9/22* | (2006.01) |

(52) U.S. Cl.
CPC ............ *E02F 9/2066* (2013.01); *B60W 10/06* (2013.01); *E02F 9/2246* (2013.01); *F02D 11/105* (2013.01); *F02D 31/007* (2013.01); *F02D 41/022* (2013.01); *F02D 41/021* (2013.01); *F02D 2250/18* (2013.01)

(58) Field of Classification Search
None
See application file for complete search history.

(56) References Cited

U.S. PATENT DOCUMENTS

| | | | |
|---|---|---|---|
| 5,319,559 A | 6/1994 | Kusaka et al. | |
| 6,719,663 B2 | 4/2004 | Nishio et al. | |
| 7,778,757 B2 | 8/2010 | Brattberg | |
| 8,409,054 B2 | 4/2013 | Lin | |

(Continued)

FOREIGN PATENT DOCUMENTS

| | | |
|---|---|---|
| WO | WO 2013/081771 | 6/2013 |

*Primary Examiner* — Adam Alharbi
(74) *Attorney, Agent, or Firm* — Caterpillar Inc.; James Bennin

(57) ABSTRACT

A power system is disclosed for use with a mobile machine having a work tool. The power system may have an engine, a first input device configured to generate a first signal indicative of an operator-desired output of the engine, a second input device configured to generate a second signal indicative of an operator-desired movement of the work tool, and a controller in communication with the engine, the first input device, and the second input device. The controller may be configured to adjust fueling of the engine based on the first signal and based on a desired speed of the engine during a first mode of operation, and to adjust fueling of the engine based on the first signal and a desired torque of the mobile machine during a second mode of operation. The controller may be further configured to selectively switch operation of the machine between the first and second modes based on the second signal.

19 Claims, 3 Drawing Sheets

(56) References Cited

U.S. PATENT DOCUMENTS

| | | | |
|---|---|---|---|
| 8,504,257 B2 | 8/2013 | Yamaguchi et al. | |
| 2002/0193935 A1* | 12/2002 | Hashimoto | F02D 11/105 |
| | | | 701/110 |
| 2007/0186548 A1* | 8/2007 | Smith | E02F 9/2217 |
| | | | 60/413 |
| 2012/0310489 A1 | 12/2012 | Hague et al. | |
| 2012/0310493 A1 | 12/2012 | Fukuhara et al. | |
| 2016/0052522 A1* | 2/2016 | Matsuo | F16H 61/0262 |
| | | | 74/664 |
| 2016/0121896 A1* | 5/2016 | Matsuo | B60W 10/02 |
| | | | 701/53 |

* cited by examiner

POWER SYSTEM HAVING CLUTCH-BASED FUEL CONTROL MODES

RELATED APPLICATIONS

This application is based on and claims priority to U.S. Provisional Application No. 62/089,967 filed on Dec. 10, 2014, the contents of which are expressly incorporated herein by reference.

TECHNICAL FIELD

The present disclosure relates generally to a power system and, more particularly, to a power system having clutch-based fuel control modes.

BACKGROUND

A governor is a device used to control engine fueling of a mobile machine based indirectly on operator input. In particular, the operator of the machine may not directly control fueling. Instead, the operator may only indicate a desired engine speed (e.g., via throttle pedal position), and the governor may adjust engine fueling to maintain the desired engine speed regardless of fluctuations in load placed on the engine. For example, when the load increases (e.g., when the machine encounters an incline), the engine could be caused to lug due to the increased load. In this example, assuming the operator maintains the same throttle pedal position, the governor automatically increases fueling to maintain the desired engine speed throughout the incline. Likewise, when the load decreases (e.g., when the machine encounters a decline), the engine could overspeed due to the load reduction. In this example, the governor automatically decreases fueling.

While a speed governor (i.e., a governor that adjusts engine fueling based on engine speed) may perform satisfactorily in some situations, it may be undesired in other situations. For example, there may be situations when the operator is not concerned with the speed of the engine and instead wants only to maintain a specific torque at wheels (a.k.a., rimpull torque) of the machine regardless of fluctuations in engine speed. In these situations, the speed governor may not provide the desired level of control.

Another type of governor is known as a torque governor. A torque governor is configured to adjust engine fueling based on operator input indicative of desired rimpull torque. For example, the operator may depress the throttle pedal indicating a desired percentage of a maximum available torque be applied to the wheels of the machine. The governor detects and/or determines the actual torque being directed from the engine to the wheels, and selectively adjusts fueling based on the difference between the desired and actual torques.

Although a torque governor may provide an added level of machine control to the operator, it may also be problematic in some situations. For example, if the operator were to suddenly request a significant amount of hydraulic power from the machine (e.g., via fast and/or high-force lifting of a work tool) when the machine's engine is being fueled based on desired rimpull torque, the engine would lug due to the sudden increase in load for the same amount of fuel. When the engine lugs, the hydraulic system of the machine might not respond properly.

One exemplary attempt to improve machine operation is disclosed in US Patent Publication No. 2012/0310493 (the '493 publication) of Fukuhara et al. that published on Dec. 6, 2012. Specifically, the '493 publication discloses a work vehicle having an engine, a travel device, a hydraulic pump, a work implement, a torque converter device, and a controller. The torque converter device includes a torque converter and a lockup clutch. The controller is configured to switch the lockup clutch from a connected state to a non-connected state when a load increases on the work implement. By switching the lockup clutch to the nor-connected state, the total load on the engine may decrease, thereby inhibiting lugging of the engine due to the sudden load increase on the work implement.

Although the work vehicle of the '493 publication may experience a decrease in engine lugging and/or have improved hydraulic response during simultaneous travel and tool use, it may be problematic. In particular, the work vehicle may experience a loss of efficiency when operating with the lockup clutch in the non-connected state during torque-governing of the engine. In particular, some losses will be experienced during disconnect of the lockup clutch. And even though the load on the engine may be reduced, fueling based on torque may not fully take into account the work implement load. Thus, the engine may still lug to some degree, which further reduces machine efficiency.

The disclosed power system is directed to overcoming one or more of the problems set forth above and/or other problems of the prior art.

SUMMARY

In one aspect, the present disclosure is directed to a power system for use with a mobile machine having a work tool. The power system may include an engine, a first input device configured to generate a first signal indicative of an operator-desired output of the engine, a second input device configured to generate a second signal indicative of an operator-desired movement of the work tool, and a controller in communication with the engine, the first input device, and the second input device. The controller may be configured to adjust fueling of the engine based on the first signal and based on a desired speed of the engine during a first mode of operation, and to adjust fueling of the engine based on the first signal and a desired torque of the mobile machine during a second mode of operation. The controller may be further configured to selectively switch operation of the machine between the first and second modes based on the second signal.

In another aspect, the present disclosure is directed to a mobile machine. The machine may include a frame, traction devices supporting the frame, a work tool operatively connected to the frame, and an engine configured to produce power that drives the traction devices. The machine may also include a transmission disposed between the engine and the traction devices, a torque converter coupling the engine to the transmission, and a pump powered by the engine to pressurize fluid directed to the work tool. The machine may further include a throttle pedal configured to generate a first signal indicative of an operator-desired output of the engine, an input device configured to generate a second signal indicative of an operator-desired movement of the work tool, a first sensor configured to generate a third signal indicative of an actual speed of the engine, a second sensor configured to generate a fourth signal indicative of saturation of the pump, and a controller in communication with the engine, the throttle pedal, the input device, the first sensor, and the second sensor. The controller may be configured to selectively enable and disable a lockup clutch of the torque converter based on the second, third, and fourth signals, and to selectively adjust fueling of the engine based on the first signal, third signal, and a desired speed when the lockup clutch is engaged. The controller may be further configured to selectively adjust fueling of the engine based on the first signal and a desired torque of the traction devices when the lockup clutch is disengaged.

In another aspect, the present disclosure is directed to a method of fueling an engine of a mobile machine having a work tool. The method may include receiving a first input indicative of an operator-desired output of the engine, and receiving a second input indicative of an operator-desired movement of the work tool. The method may further include adjusting fueling of the engine based on the first input and based on a desired speed of the engine during a first mode of operation, and adjusting fueling of the engine based on the first input and a desired torque of the mobile machine during a second mode of operation. The method may also include selectively switching operation of the machine between the first and second modes based on the second input.

DETAILED DESCRIPTION

Figure 1:
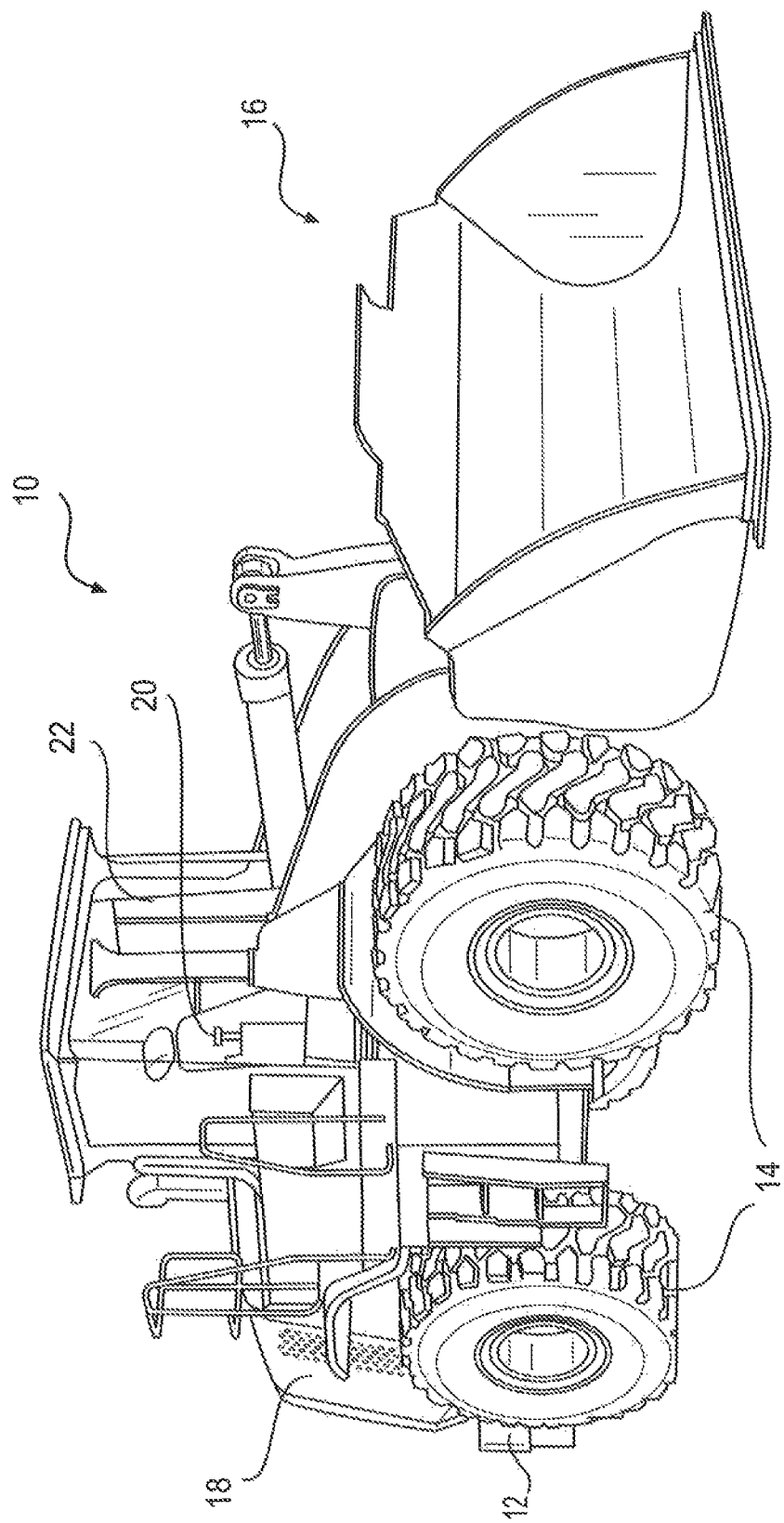
FIG. 1 is an isometric illustration of an exemplary disclosed machine.

FIG. 1 illustrates an exemplary mobile machine 10. In the depicted embodiment, machine 10 is a wheel loader. It is contemplated, however, that machine 10 may embody another type of mobile machine such as an articulated haul truck, an off-highway mining truck, a motor grader, or another machine known in the art. Machine 10 may include a frame 12, traction devices (e.g., wheels) 14 that support frame 12, a hydraulic work tool ("tool") 16 operatively connected to frame 12, and a power system 18 configured to produce power that drives traction devices 14 and tool 16. Machine 10 may also include one or more input devices 20 (e.g., a tool lever 20a and a throttle pedal 20b—shown in FIG. 2) located within an operator station 22 for use in manual control of machine 10.

Figure 2:
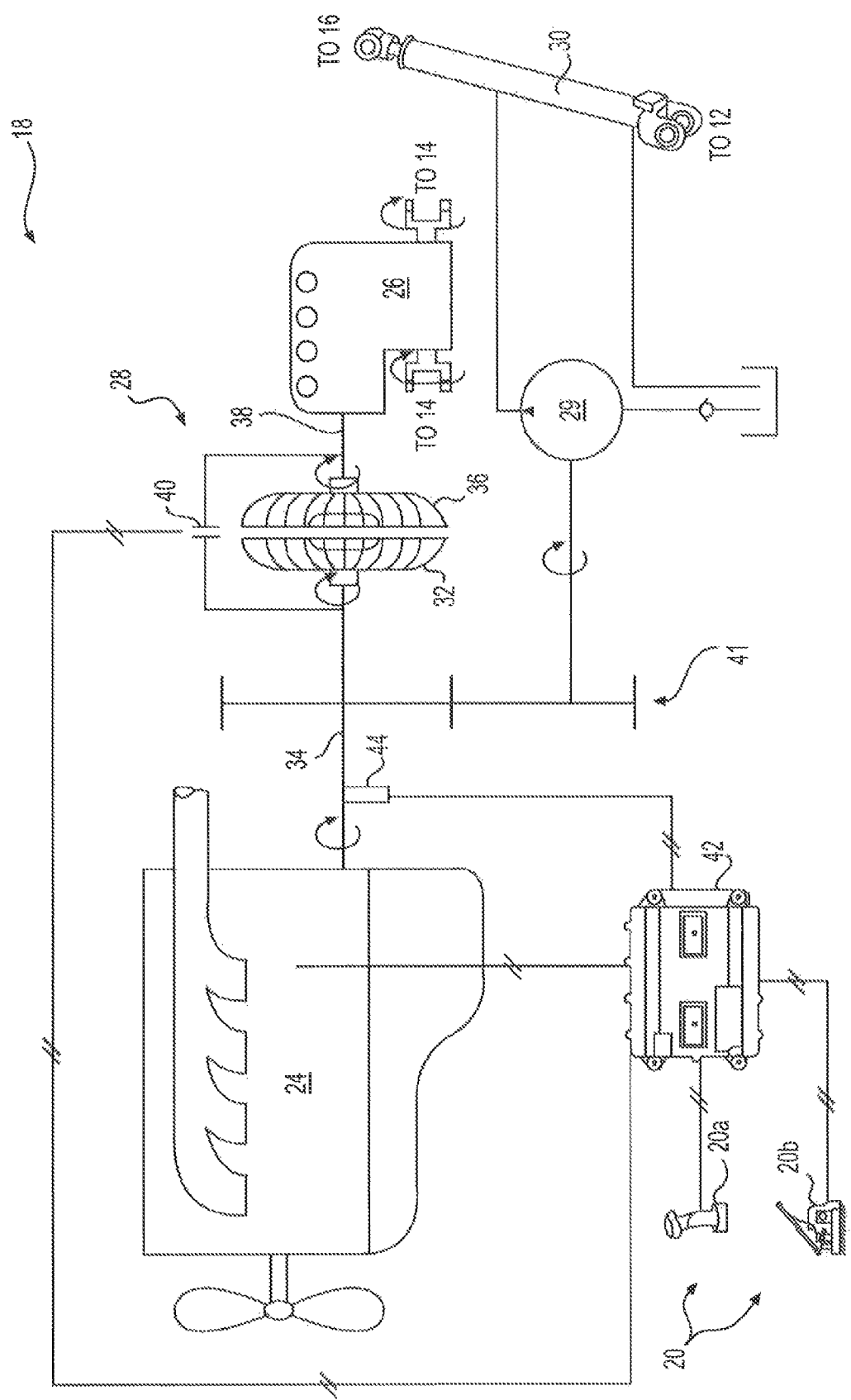
FIG. 2 is a diagrammatic illustration of an exemplary disclosed power system that may be used with the machine of FIG. 1.

As shown in FIG. 2, power system 18 may be an assembly of cooperating components that transfer power from an engine 24 to traction devices 14 and tool 16 (shown only in FIG. 1) in response to input received from the operator via devices 20. In the disclosed embodiment, these components include, among other things, a transmission 26 that is operatively connected to engine 24 by way of a torque converter 28, and a pump 29 that is driven by engine 24 to pressurize fluid directed through an actuator 30 of work tool 16. In the depicted example, engine 24 is an internal combustion engine (e.g., a diesel, gasoline, or natural gas engine), and transmission 26 is a step-change transmission having multiple distinct gear ranges. It should be noted that other types of engines and/or transmissions may be used, if desired.

Torque converter 28 may be a conventional type of torque converter having a impeller 32 connected to an output 34 of engine 24, a turbine 36 connected to an input 38 of transmission 26, and a lockup clutch 40 disposed between output 34 and input 38 in parallel with impeller 32 and impeller 34. In this configuration, as output 34 rotates impeller 32, a flow of fluid may be generated and passed through turbine 36, causing turbine 36 to rotate and drive input 38. This fluid connection, while capable of passing power from engine 24 to transmission 26, may drive input 33 to rotate at a different speed and/or with a different torque than output 31. This may allow a load of transmission 26 to be somewhat isolated from engine 24, such that shock-loading of engine 24 does not occur. In addition, the fluid coupling facilitated by torque converter 28 may allow for torque multiplication in some applications.

Some power may be lost as heat generated within the fluid passing between impeller 32 and impeller 34. Accordingly, the efficiency of machine 10 may be lower when power is being hydraulically transferred from engine 24 to transmission 26. In order to improve the efficiency of machine 10, lockup clutch 40 may be selectively engaged such that output 34 becomes mechanically locked to input 38. When lockup clutch 40 is engaged, input 38 may rotate at the same speed and with the same torque as output 34.

Lockup clutch 40 may be selectively engaged and disengaged based on any number of factors known in the art. For example, lockup clutch 40 may be engaged and disengaged based on a gear selection of transmission 26, based on a travel direction, based on a travel speed, based on loading, when commanded by an operator, etc.

Pump 29 may be connected to engine 24 in parallel with torque converter 28 (e.g., by way of a gear arrangement 41). Pump 29 may be a fixed or variable displacement pump, and any number, type, and/or configuration of valving (not shown) may be used to direct the fluid from pump 29 through actuator 30. Pump 29 may be driven by engine 24 to pressurize fluid and to direct the fluid through the associated valving to actuator 30 in response to operator displacement of tool lever 20a. For example, tool lever 20a may be movable through a range, from a neutral position to a maximum displaced position, to request movement of actuator 30 at a proportional speed and/or with a proportional force. As the operator requests greater speed and/or force from actuator 30 (e.g., by displacing tool lever 20a more toward the maximum displaced position), a greater amount and/or pressure of fluid may be required from pump 29, causing a corresponding greater load to be placed on engine 24 by pump 29.

A controller 42 may be in communication with input devices 20 and engine 24, and configured to selectively adjust fueling of engine 24 in two different ways based on signals received from input devices 20. For example, controller 42, during a first mode of operation, may be configured to adjust fueling of engine 24 based on a difference between an actual speed of engine 24 indicated via a sensor 44, and a desired engine speed indicated via throttle pedal 20b. In particular, throttle pedal 20b, like tool lever 20a, may also be movable through a range from a neutral position to a maximum displaced position to indicate a proportional output of machine 10. In one example, the output is a desired engine speed. In this mode of operation, controller 42 may receive a first signal generated by throttle pedal 20b, and compare the value of the first signal to the value of a second signal generated by engine speed sensor 44. In closed-loop manner, controller 42 may then selectively increase or decrease fueling of engine 24 to reduce a difference between the actual and desired engine speeds.

In another mode of operation, controller 42 may be configured to adjust fueling of engine 24 based on a desired torque of machine 10 (e.g., based on a desired rimpull or engine torque). In particular, during this mode of operation, throttle pedal 20*b* may be movable to indicate a desired torque output instead of a desired engine speed. The desired torque output, along with the actual engine speed of machine 10 (as detected via sensor 44) may then be used to calculate in open-loop fashion an amount of fuel that should be used to generate the desired torque. Controller 42 may then adjust fueling accordingly.

In the disclosed embodiment the mode of operation implemented by controller 42 may be at least partially dependent on the status of lockup clutch 40. For example, when lockup clutch 40 is engaged, controller 42 may adjust fueling based on the desired torque. In contrast, when lockup clutch 40 is disengaged, controller 42 may adjust fueling based on the desired engine speed. This may allow for high-control and high-efficiency operation of machine 10 under varying conditions.

Lockup clutch 40 may only be engaged when the functionality of lockup clutch 40 is enabled, regardless of the status of the factors normally causing lockup clutch 40 to engage. For example, if lockup clutch 40 normally engages when machine 10 is traveling at 10 mph or faster in second gear, this engagement may be inhibited if controller 42 has not enabled the functionality of lockup clutch 40. Similarly, if lockup clutch 40 is engaged and controller 42 disables the functionality of lockup clutch 40, lockup clutch 40 may be caused to disengage, even if the factors normally required for disengagement are not present. For example, even if machine 10 is traveling at the right speed in the right gear, controller 42 may still be able to cause disengagement by disabling the functionality of lockup clutch 40. Likewise, although controller 42 may have enabled lockup clutch 40, lockup clutch 40 may only engage when the other required conditions are satisfied.

Figure 3:
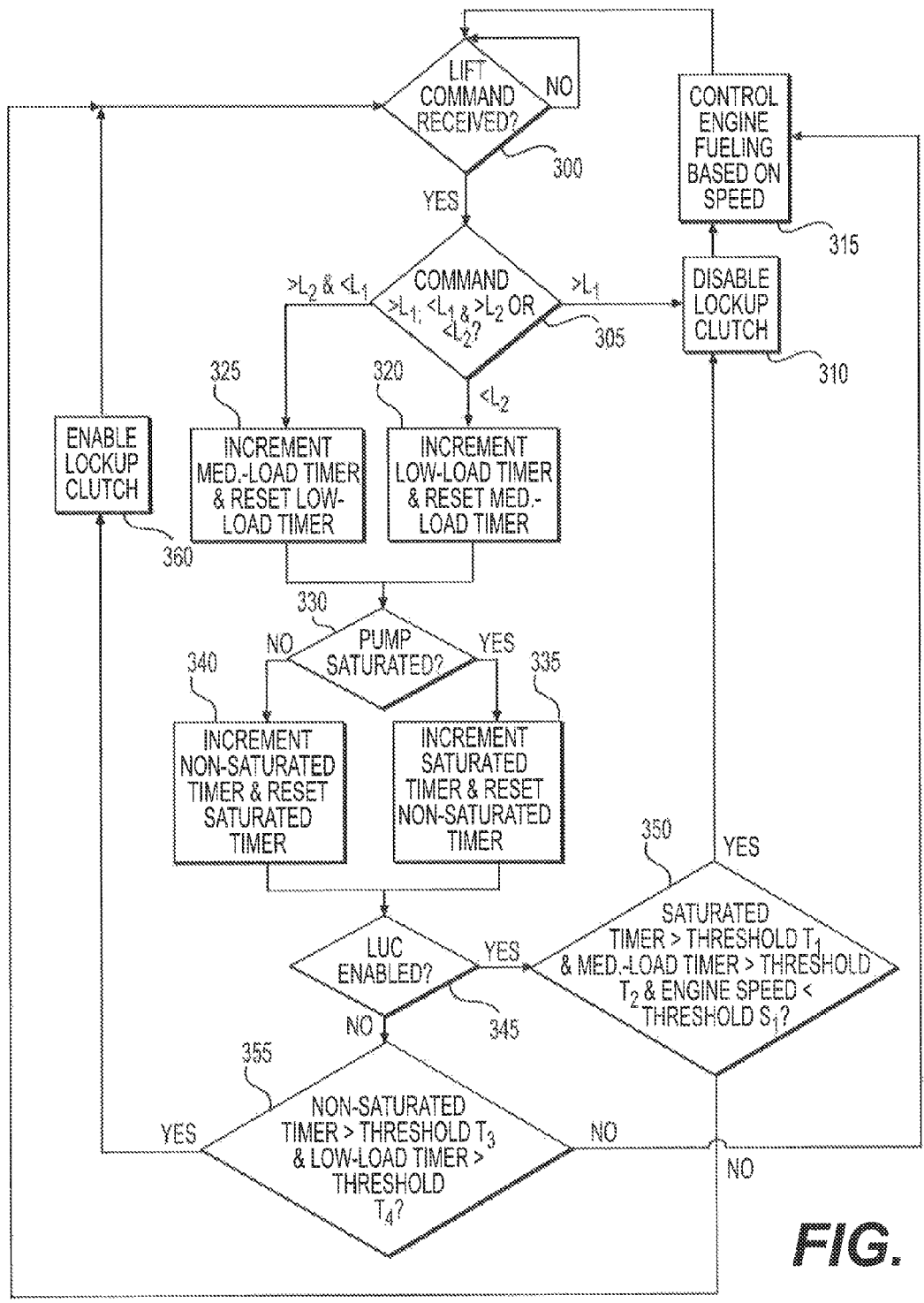
FIG. 3 is flowchart depicting an exemplary disclosed control method performed by the power system of FIG. 2.

In some instances, controller 42 may selectively enable or disable lockup clutch 40 based on operation of work tool 16 (referring to FIG. 1). For instance, during travel of machine 10 when lockup clutch 40 is engaged and engine 24 is being controlled based on desired torque (e.g., desired rimpull torque), a sudden and/or significant increase in hydraulic load associated with movement of work tool 16 by actuator 30 could cause lugging of engine 24. In these instances, controller 42 may selectively disable lockup clutch 40. Likewise, when the hydraulic load is low or non-existent, controller 42 may enable lockup clutch 40 to improve efficiency. FIG. 3 illustrates a strategy implemented by controller 42 to determine when lockup clutch 40 should be enabled or disabled based on the hydraulic load. FIG. 3 will be discussed in more detail in the following section to further illustrate the disclosed concepts.

Controller 42 may include a memory, a secondary storage device, a clock, and one or more processors that cooperate to accomplish a task consistent with the present disclosure. Numerous commercially available microprocessors can be configured to perform the functions of controller 42. It should be appreciated that controller 42 could readily embody a general transmission or machine controller capable of controlling numerous other functions of machine 10. Various known circuits may be associated with controller 42, including signal-conditioning circuitry, communication circuitry, and other appropriate circuitry. It should also be appreciated that controller 42 may include one or more of an application-specific integrated circuit (ASIC), a field-programmable gate array (FPGA), a computer system, and a logic circuit configured to allow controller 42 to function in accordance with the present disclosure.

INDUSTRIAL APPLICABILITY

While the power system of the present disclosure has potential application in any engine-powered mobile machine having a lockup clutch, the disclosed power system may be particularly applicable to machines with work tools capable of placing large hydraulic loads on the engine during travel of the machine. For example, the disclosed system may be particularly applicable to wheel loaders (and other machines) capable of lifting a loaded work tool while roading. The disclosed power system may improve machine operation by selectively switching between different fueling control modes based on the hydraulic load and status of the lockup clutch. Operation of power system 18 will now be described in detail.

During travel of machine 10, controller 42 may monitor input devices 20 (specifically tool lever 20*a*) to determine if a work tool command (e.g., a lift command) is received from the operator (Step 300). As long as a work tool command is not received, machine 10 may be operated in a conventional manner. For example, lockup clutch 40 may be engaged and disengaged according to any strategy known in the art (e.g., based on a travel speed, travel direction, and/or a transmission gear). As described above, any time lockup clutch 40 is engaged, controller 42 may selectively adjust fueling of engine 24 based on the operator-desired torque (e.g., desired rimpull torque). And any time lockup clutch 40 is disengaged, controller 42 may selectively adjust fueling of engine 24 based on the operator-desired engine speed.

When controller 42 determines at step 300 that a lift command has been received from the operator during travel of machine 10, controller 42 may determine a magnitude of the command (Step 305). For example, controller 42 may determine if the command is a request for a high-speed and/or high-force movement of work tool 16 (e.g., if the lift command is greater than a first lift threshold $L_1$), if the lift command is a request for a medium-speed and/or medium-force movement (e.g., if the lift command is less than $L_1$, but greater than a second lift threshold $L_2$), or if the lift command is a request for a low-speed and/or low-force movement (e.g., if the lift command is less than $L_2$).

When the lift command is a request for a high-speed and/or high-force work tool movement, controller 42 may assume that a large hydraulic load may soon be placed on engine 24 and responsively disable lockup clutch 40 (Step 310). In this situation, if lockup clutch 40 is already disengaged, no change in the fueling strategy employed by controller 42 may be instituted. However, if lockup clutch 40 is engaged at step 310, disabling of lockup clutch 40 may cause disengagement of lockup clutch 40 and a corresponding control mode switch from engine fueling control based on desired rimpull torque to engine fueling control based on desired engine speed (Step 315). By switching from torque-based control to speed-based control, there may be a lower risk of engine 24 lugging due to application of the hydraulic load. In the disclosed example, the threshold $L_1$ for determining if the lift command is a request for a high-speed and/or high-force work tool movement may be about 80% of the maximum lift command.

Returning to Step 305, when the lift command is a request for a medium-speed and/or medium-force work tool movement, controller 42 may increment a medium-load timer and reset any low-load timer that may have been incremented during a previous cycle (Step 320). Likewise, when the lift command is a request for a low-speed and/or low-force work tool movement, controller 42 may increment a low-load timer and reset any medium-load timer that may have been incremented during a previous cycle (Step 325). The purpose of these timers, as will be explained in more detail below, is to filter out short-term commands that may not have a significant effect on the performance of engine 24.

For example, during travel of machine 10, the operator may pull back on tool lever 20a so as to quickly raise work tool 16 and avoid a rock in the road, and then immediately release or push forward on tool lever 20a after work tool 16 has avoided collision with the rock. In another example, the operator may be lifting work tool 16 with a medium speed and/or force, but temporarily suspend or reduce the lift speed and/or force for some reason. Such short duration changes in the movement speed and/or force of work tool 16 should not cause a corresponding load change on engine 24 that is significant enough to affect engine speed. Accordingly, the duration of the requested movement should be monitored via the timers, and control selectively effected based on the value of the timers. In the disclosed embodiment, $L_2$ may be about 25-30% of the maximum lift command.

After completion of steps 320 or 325, controller 42 may determine if pump 29 is saturated (Step 330). Pump 29 may be capable of pressurizing a specific amount of fluid for a given speed of engine 24, and actuator 30 may or may not be capable of immediately consuming the full amount. Controller 42 may consider pump 29 to be saturated when the amount of fluid being consumed by actuator 30 exceeds a threshold percent of the amount of fluid that pump 29 is capable of pressurizing at the given engine speed, in the disclosed embodiment, the threshold percent may be about 95-100%. When controller 42 determines that the amount of fluid being consumed by actuator 30 is about equal to 95-100% of the amount of fluid that pump 29 is capable of pressurizing at the given engine speed, controller 42 may increment a saturated timer and reset any non-saturated timer that may have been incremented during a previous cycle (Step 335). Likewise, when controller 42 determines that the amount of fluid being consumed by actuator 30 is less than about 95% of the amount of fluid that pump 29 is capable of pressurizing at the given engine speed, controller 42 may increment the non-saturated timer and reset the saturated timer that may have been incremented during a previous cycle (Step 340). Similar to the load timers discussed above, controller 42 may use the saturated and non-saturated timers to filter out short-term saturation changes associated with pump 29. This filtering may help to stabilize operation of power system 18.

Following completion of step 335 or 340, controller 42 may determine if lockup clutch (LUC) 40 is currently enabled (Step 345). When controller 42 determines at step 345 that lockup clutch 40 is enabled, controller 42 may compare the saturated timer to a threshold time $T_1$, the medium-load timer to a threshold time $T_2$, and the current speed of engine 24 (as determined via sensor 44) to a threshold speed $S_1$ (Step 350). If the saturated timer is greater than $T_1$, the medium-load timer is greater than $T_2$, and the engine speed is less than $S_1$ (i.e., if the medium-speed and/or medium force work tool request has been requested for a significant amount of time, pump 29 has been saturated for a significant amount of time, and the speed of engine 24 is low), control may proceed to step 310, at which controller 42 may disable lockup clutch 40. In the disclosed example, the threshold speed $S_1$ may be about 1800 rpm, although other speeds may be used. As described above with respect to step 315, if lockup clutch 40 is already disengaged at this time, no change in the engine fueling strategy may be implemented. However, if lockup clutch 40 is engaged when control proceeds to step 310, the strategy may switch modes to speed-based fueling at step 315. In other words, controller 42 may not necessarily change its fuel control strategy based on disablement of lockup clutch 40, but may always change its control strategy when the engagement status of lockup clutch 40 changes.

Returning to step 350, if the saturated timer is less than the medium-load timer is less than $T_2$, or the actual engine speed is greater than $S_1$, controller 42 may maintain enablement of lockup clutch 40 and continue fuel adjustments of engine 24 with whatever strategy was being previously employed. For example, assuming that lockup clutch 40 is engaged after completion of step 350:No, controller 42 may continue making adjustments based on operator-desired torque. In contrast, assuming that lockup clutch 40 is disengaged after completion of step 350:No, controller 42 may continue making adjustments based on operator-desired engine speed. In other words, controller 42 may not change its fuel control strategy based on enablement of lockup clutch 40. Instead, as described above, controller 42 may only change its control strategy when the engagement status of lockup clutch 40 changes.

Returning to step 345, when controller 42 determines that lockup clutch 40 is not enabled, controller 42 may compare the non-saturated timer to a threshold time $T_3$, and the low-load timer to a threshold time $T_4$ (Step 355). If the non-saturated timer is greater than $T_3$ and the low-load timer is greater than $T_4$ (i.e., if the low-speed and/or low-force work tool request has been requested for a significant amount of time and pump 29 has not been saturated for a significant amount of time), controller 42 may enable lockup clutch 40 (Step 360). As described above, enablement of lockup clutch 40 may not affect a change in fuel control modes, as that change may be dictated instead by the engagement status of lockup clutch 40. Control may proceed from step 360 to step 300.

Returning to Step 355, if the non-saturated timer is less than $T_3$ or the low-load timer is less than $T_4$, control may proceed to step 315. That is, because lockup clutch 40 is disabled at this time, controller 42 may continue to adjust fueling of engine 24 based on the operator-desired engine speed.

The disclosed power system may improve control and efficiency of machine 10. In particular, by selectively switching fuel control modes based on the engagement status of lockup clutch 40, the advantages of both modes may be realized. In particular, greater control may be provided during torque-based engine fueling, while greater efficiency may be realized during speed-based fueling when engine 24 is heavily loaded.

It will be apparent to those skilled in the art that various modifications and variations can be made to the power system of the present disclosure without departing from the scope of the disclosure. Other embodiments will be apparent to those skilled in the art from consideration of the specification and practice of the power system disclosed herein. It is intended that the specification and examples be considered as exemplary only, with a true scope of the disclosure being indicated by the following claims and their equivalents.

What is claimed is:

1. A power system for a mobile machine having a work tool, the power system comprising:
   an engine;
   a transmission connected to the engine through a torque converter;
   a first input device configured to generate a first signal indicative of an operator-desired output of the engine;

a second input device configured to generate a second signal indicative of an operator-desired movement of the work tool;

a pump configured to pressurize fluid used to lift the work tool;

a sensor configured to generate a third signal indicative of an actual speed of the engine; and a controller in communication with the engine, the first input device, the sensor, and the second input device, the controller being configured to:

selectively enable and disable a lockup clutch of the torque converter based on the second signal;

increment a load timer when the second signal indicates a desire to lift the work tool at a speed below the first threshold speed;

determine if the pump is saturated when the second signal indicates a desire to lift the work tool at the speed below a first threshold speed;

selectively increment a pump timer based on saturation of the pump;

determine when the lockup clutch is enabled; and selectively disable the lockup clutch based on the pump timer, the load timer, and the third signal.

2. The power system of claim 1, wherein the controller is configured to:

adjust fueling of the engine based on the first signal and based on a desired speed of the engine during a first mode of operation;

adjust fueling of the engine based on the first signal and a desired torque of the mobile machine during a second mode of operation;

automatically adjust fueling of the engine based on the desired torque when the lockup clutch is engaged; and automatically adjust fueling of the engine based on the desired speed when the lockup clutch is disengaged.

3. The power system of claim 1, wherein the controller is configured to disable the lockup clutch when the second signal indicates the desire to lift the work tool at the speed above the first threshold speed.

4. The power system of claim 1, wherein the controller is further configured to:

selectively switch operation of the mobile machine between the first mode and the second mode based on the second signal, wherein, when selectively switching operation, the controller is further configured to switch operation from the first mode to the second mode when the second signal indicates a desire to lift the work tool at a speed above the first threshold speed.

5. The power system of claim 4, wherein, when the second signal indicates a desire to lift the work tool at a speed below the first threshold speed, the controller is configured to increment the load timer.

6. The power system of claim 1, wherein:

when the second signal indicates a desire to lift the work tool at a speed above a second threshold, the load timer is a high-load timer;

when the pump is saturated, the pump timer is a saturated timer; and the controller is configured to disable the lockup clutch and adjust fueling of the engine based on the first signal and the desired speed of the engine when the saturated timer indicates an elapsed time is greater than a first time threshold, the high-load timer indicates an elapsed time is greater than a second time threshold; and the third signal indicates the actual engine speed is less than or equal to a speed threshold.

7. The power system of claim 6, wherein the controller is configured to maintain enablement of the lockup clutch and adjust fueling of the engine based on the first signal and based on the desired torque of the mobile machine when the saturated timer indicates an elapsed time is less than the first time threshold, the high-load timer indicates an elapsed time is less than the second time threshold; or the third signal indicates the actual engine speed is greater than the speed threshold.

8. The power system of claim 1, wherein:

when the second signal indicates a desire to lift the work tool at a speed below a second threshold, the load timer is a low-load timer;

when the pump is not saturated, the pump timer is a non-saturated timer; and the controller is configured to enable the lockup clutch and adjust fueling of the engine based on the first signal and based on the desired torque of the mobile machine when the non-saturated timer indicates an elapsed time is greater than a third time threshold, and the low-load timer indicates an elapsed time is greater than a fourth time threshold.

9. The power system of claim 8, wherein the controller is configured to maintain disablement of the lockup clutch and adjust fueling of the engine based on the first signal and based on the desired speed of the engine when the non-saturated timer indicates an elapsed time is less than the third time threshold or the low-load timer indicates an elapsed time is less than the fourth time threshold.

10. The power system of claim 1, wherein:

when the second signal indicates a desire to lift the work tool at a speed above a second threshold, the load timer is a high-load timer;

when the second signal indicates a desire to lift the work tool at a speed below the second threshold, the load timer is a low-load timer;

when the pump is saturated, the pump timer is a saturated timer;

when the pump is not saturated, the pump timer is a non-saturated timer; and the controller is configured to:

selectively reset the high-load timer when the second signal indicates a desire to lift the work tool at a speed above the second threshold;

selectively reset the low-load timer when the second signal indicates a desire to lift the work tool at a speed below the second threshold;

selectively reset the saturated timer when the pump is not saturated; and selectively reset the non-saturated timer when the pump is saturated.

11. The power system of claim 1, wherein the controller is configured to determine the desired torque of the mobile machine based on current fueling of the mobile machine and an actual speed of the engine.

12. The power system of claim 11, further including a sensor configured to generate a third signal indicative of the actual speed of the engine.

13. A mobile machine, comprising:

a frame;

traction devices supporting the frame;

a work tool operatively connected to the frame;

an engine configured to produce power that drives the traction devices;

a transmission disposed between the engine and the traction devices;

a torque converter coupling the engine to the transmission;

a pump powered by the engine to pressurize fluid directed to the work tool;

a throttle pedal configured to generate a first signal indicative of an operator-desired output of the engine;

an input device configured to generate a second signal indicative of an operator-desired movement of the work tool;

a first sensor configured to generate a third signal indicative of an actual speed of the engine;

a second sensor configured to generate a fourth signal indicative of saturation of the pump; and a controller in communication with the engine, the throttle pedal, the input device, the first sensor, and the second sensor, the controller being configured to:

selectively enable and disable a lockup clutch of the torque converter based on the second signal, the third signal, and the fourth signal;

selectively adjust fueling of the engine based on the first signal, the third signal, and a desired engine speed when the lockup clutch is engaged; and selectively adjust fueling of the engine based on the first signal and a desired torque of the traction devices when the lockup clutch is disengaged.

14. A method of fueling an engine of a mobile machine having a work tool, the method comprising:

receiving a first input indicative of an operator-desired output of the engine;

receiving a second input indicative of an operator-desired movement of the work tool;

receiving a third input indicative of an actual speed of the engine;

receiving a fourth input indicative of saturation of the pump;

selectively enable and disable a lockup clutch of the torque converter based on the second signal, the third signal, and the fourth signal;

selectively adjusting fueling of the engine based on the first input, the third input, and a desired speed of the engine when the lockup clutch is engaged;

adjusting fueling of the engine based on the first input and a desired torque of the mobile machine when the lockup clutch is disengaged; and selectively switching operation of the mobile machine between the lockup clutch being engaged or disengaged based on the second input.

15. The method of claim 14, wherein:

the mobile machine further includes a transmission connected to the engine through a torque converter; and the method further includes selectively enabling and disabling a lockup clutch of the torque converter based on the second input.

16. The method of claim 15, further including:

automatically adjusting fueling of the engine based on the desired torque when the lockup clutch is engaged; and automatically adjusting fueling of the engine based on the desired speed when the lockup clutch is disengaged.

17. The method of claim 15, wherein selectively disabling the lockup clutch includes selectively disabling the lockup clutch when the second input indicates a desire to lift the work tool at a speed above a first threshold speed.

18. The method of claim 15, wherein:

the mobile machine further has a pump configured to pressurize fluid used to lift the work tool; and the method further includes:

sensing an actual speed of the engine;

incrementing a load timer when the second input indicates a desire to lift the work tool at a speed below the first threshold speed;

determining if the pump is saturated when the second input indicates the desire to lift the work tool at the speed below the first threshold speed;

selectively incrementing a pump timer based on saturation of the pump;

determining when the lockup clutch is enabled; and when the lockup clutch is enabled, selectively disabling the lockup clutch based on the pump timer, the load timer, and the actual speed of the engine.

19. The mobile machine of claim 13, where the controller is further configured to:

switch operation from the lockup clutch being engaged to the lockup clutch being engaged when the second signal indicates a desire to lift the work tool at a speed above a first threshold speed.

* * * * *